Patented Apr. 14, 1942

2,280,035

UNITED STATES PATENT OFFICE 2,280,035

PROCESS OF MAKING IMPROVED OIL WELL WEIGHTING MATERIALS

Leslie Roth Harrison, Jr., Malvern, Ark., assignor to Magnet Cove Barium Corporation, Malvern, Ark., a corporation of Arkansas No Drawing. Application August 28, 1941, Serial No. 408,680

15 Claims. (Cl. 252—8.5)

My invention relates to improvements in process of making improved oil well weighting materials, and is a continuation in part of my copending application, Serial No. 385,758.

My invention relates to the production of oil well weighting materials for use as oil well drilling "muds." In the past, ground materials such as barite have been commonly used as oil well weighting materials, but this material per se has not always proven itself to be entirely satisfactory, for example many products have such high viscosity that a very heavy mixture can not be made without the fluid becoming sticky and thereby gumming the drilling machinery.

An object of my invention is to produce an improved oil well weighting material by the use of ground barite to which small quantities of wetting agents have been added together with unsaponifiable oils, acids, alkalies or salts, and subsequently calcined in order to remove the air-avid effects of the wetting agents.

A further object is to provide a weighting material which may be satisfactorily used as an oil well drilling "mud," and which will not appreciably lower the apparent weight in the well by virtue of the fact that the material is devoid of the air-avid effect usually present in ground barite or similar substances.

A further object is to provide a weighting material, the viscosity characteristics of which are materially lowered.

To produce my improved weighting material I have found that by combining and mixing ground natural barite in wet pulp with small quantities of organic wetting agents, thoroughly coating the ground particles of barite, and then by subsequently calcining or heating the resultant mixture, that the wetting agent may be removed from the mix, thereby leaving the ground material in a condition to be more satisfactorily used as an oil well weighting material.

In preparing my improved oil well weighting material I use ground natural barite ore and add thereto suitable organic wetting agents either alone or in combination with unsaponifiable oils and/or inorganic acids, alkalies or salts, such wetting agents, for example, as primary amines, secondary amines, tertiary amines, quaternary amines, primary amine salts, secondary amine salts, tertiary amine salts, quaternary amine salts, primary, secondary, tertiary and quaternary amine soaps, sulphonated and sulphated amines, their salts, and soaps, and others of the wetting type of chemicals too numerous to mention.

The amount of wetting agents to be used may be varied considerably, and I have found that the quantity to be used per ton of ground barite may vary as much as from .05 pound to 5 pounds. The amount of unsaponifiable oil used in the process may vary from 0 to 25 pounds per ton, and likewise the amount of inorganic acids, alkalies or salts used may vary from 0 to 25 pounds per ton. All quantities are based on pounds of reagents per 2,000 pounds (one ton) of ground weighting material. The percent of solids of the wet pulp used in mixing the weighting materials varies from 1 to 80, and I have found from experimentation that from 15% to 30% of solids in mixing is the most desirable proportion.

In many cases it may be necessary to agitate the mass of weighting material and the wetting agent at a low percent solids in water, subsequently thickening it in a metallurgical thickener tank, then filter it in any of various types of filters. By following this procedure of thickening and filtering the slurry, the efficiency of calcination may be greatly increased.

After having made a thorough mixture of the ground barite or weighting material with the wetting agents, I then calcine the mixture in suitable apparatus under suitably controlled heat regulation. It may be found satisfactory to heat the calcining mixture only sufficiently to vaporize the wetting materials, or it may be desired to increase the heat to the necessary extent to burn or completely oxidize the wetting agents. I have found that desirable temperatures during the calcining process may vary as greatly as from 450° C. to 900° C., the degree of temperature used being dependent on the wetting agents and the inorganic chemicals used. Although lower temperatures may be satisfactorily used, when lower temperatures of the range of temperatures are used the process will be slower, and, therefore, a greater length of time will be taken to produce the desired results, whereas if the higher range of temperatures is used, the proper removal of the wetting agents and inorganic chemical substance may be done more rapidly, and yet the resultant product will be equally water-avid. In this manner, the ground barite is conditioned to become water-avid and a greater weight may thus be obtained when it is used as a weighting material or a drilling "mud." It will be understood that a wide variety of materials and combinations may be used, and likewise greatly varying temperatures may be used in the calcining, vaporizing or oxidizing process.

To clarify the situation and to define some of the terms which have been used in the above specification, I have used the term wetting agents as they are commonly called and widely used in the textile industry, namely organic chemical reagents that have a property of wetting textile materials in suitable manner to prepare the materials so that they may be more easily dyed. Common wetting agents are soaps, amines and sulphonates. In referring to unsaponifiable oils, I refer particularly to oils such as gas oil, kerosene, fuel oils, etc. The term air-avid means that a mineral is imparted surface properties which tend to make it attach to air bubbles rather than to be filmed with liquid.

I claim:

1. A method of conditioning barite as a weighting material comprising mixing the same with an organic wetting agent selected from the group consisting of primary, secondary, tertiary and quaternary amines, and calcining.

2. A method of conditioning barite as a weighting material comprising mixing the same with an organic wetting agent selected from the group consisting of primary, secondary, tertiary and quaternary amines, and calcining to a degree sufficient to remove the wetting agent.

3. A method of conditioning barite as a weighting material comprising mixing the same with an organic wetting agent selected from the group consisting of primary, secondary, tertiary and quaternary amine salts, and calcining.

4. A method of conditioning barite as a weighting material comprising mixing the same with an organic wetting agent selected from the group consisting of sulphated and sulphonated amines, and calcining.

5. A method of conditioning barite as a weighting material comprising mixing the same with an organic wetting agent selected from the group of sulphated and sulphonated amine salts, and calcining.

6. A method of conditioning barite as a weighting material comprising mixing the same with a mixture of an organic wetting agent selected from the group of primary, secondary, tertiary and quaternary amines and an inorganic substance selected from the group of inorganic acids, alkalies and salts, and calcining.

7. A method of conditioning barite as a weighting material comprising mixing the same with a mixture of an organic wetting agent selected from the group of primary, secondary, tertiary and quaternary amine salts and an inorganic substance selected from the group of inorganic acids, alkalies and salts, and calcining.

8. A method of conditioning barite as a weighting material comprising mixing the same with a mixture of an organic wetting agent selected from the group of sulphated and sulphonated amine salts and an inorganic substance selected from the group of inorganic acids, alkalies and salts, and calcining.

9. A method of conditioning barite as a weighting material comprising mixing the same with a mixture of an organic wetting agent selected from the group of sulphated and sulphonated amines and an inorganic substance selected from the group of inorganic acids, alkalies and salts, and calcining.

10. A method of conditioning barite as a weighting material comprising mixing the same with an organic wetting agent and calcining the mixture, the wetting agent being an amine soap.

11. The method of conditioning barite as a weighting material comprising mixing the same with an organic wetting agent and calcining the mixture, the wetting agent being an amine soap selected from the group of sulphated and sulphonated amine soaps.

12. The method of conditioning barite as a weighting material comprising mixing the same with an organic wetting agent, an unsaponifiable oil, and calcining the mixture, the wetting agent being an amine soap selected from the group of sulphated and sulphonated amine soaps.

13. A method of conditioning barite as a weighting material comprising mixing the same with a mixture of an organic wetting agent and an inorganic substance selected from the group of inorganic acids, alkalies and salts, the wetting agent being an amine soap, and calcining.

14. A method of conditioning barite as a weighting material comprising mixing the same with an amine wetting agent and an unsaponifiable oil, and calcining.

15. A method of conditioning barite as a weighting material comprising mixing the same with an amine wetting agent, an unsaponifiable oil, an inorganic substance selected from the group of inorganic acids, alkalies and salts, and calcining.

LESLIE ROTH HARRISON, Jr.